(12) United States Patent
Burinskiy et al.

(10) Patent No.: US 8,331,005 B2
(45) Date of Patent: Dec. 11, 2012

(54) METHOD AND SYSTEM FOR PROVIDING RESONANT FREQUENCY CHANGE COMPENSATION IN A DRIVE SIGNAL FOR A MEMS SCANNER

(75) Inventors: Alexander Burinskiy, San Jose, CA (US); James Steven Brown, Alviso, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 223 days.

(21) Appl. No.: 12/766,659

(22) Filed: Apr. 23, 2010

(65) Prior Publication Data

US 2010/0321750 A1 Dec. 23, 2010

Related U.S. Application Data

(60) Provisional application No. 61/172,470, filed on Apr. 24, 2009.

(51) Int. Cl.
*G02B 26/08* (2006.01)

(52) U.S. Cl. .................................................. 359/199.1

(58) Field of Classification Search ............... 359/199.1, 359/201.1–204.5, 213.1–215.1, 223.1–224.1
See application file for complete search history.

(56) References Cited

U.S. PATENT DOCUMENTS

| | | | |
|---|---|---|---|
| 6,856,712 B2 | 2/2005 | Fauver et al. | |
| 6,995,622 B2 | 2/2006 | Partridge et al. | |
| 7,253,386 B2 * | 8/2007 | Ernst | 250/205 |
| 7,907,019 B1 | 3/2011 | Brown | |
| 2005/0179976 A1 | 8/2005 | Davis et al. | |
| 2005/0280879 A1 | 12/2005 | Gibson et al. | |
| 2007/0063134 A1 | 3/2007 | Wine et al. | |
| 2007/0131842 A1 | 6/2007 | Ernst | |
| 2007/0273794 A1 | 11/2007 | Sprague et al. | |
| 2008/0144150 A1 | 6/2008 | Champion et al. | |

OTHER PUBLICATIONS

Notification of Transmittal of the International Search Report and the Written Opinion of the International Searching Authority, or the Declaration dated Nov. 26, 2010 in connection with International Patent Application No. PCT/US2010/032268.
James S. Brown, "System for Suppressing Undesirable Oscillations in a MEMS Scanner", U.S. Appl. No. 12/283,759, filed Sep. 16, 2008.

(Continued)

*Primary Examiner* — Euncha Cherry
(74) *Attorney, Agent, or Firm* — Andrew S. Viger; Wade J. Brady, III; Frederick J. Telecky, Jr.

(57) ABSTRACT

A method for providing feed forward compensation in a drive signal for a rapid resonant frequency change due to a rapid LASER intensity change upon a micro-electro-mechanical system (MEMS) mirror and/or a surrounding MEMS structure in a MEMS scanner causing a mirror temperature change is provided. The method includes determining an intensity factor for at least one laser beam projected onto the MEMS scanner and adjusting a drive frequency of the drive signal based on the intensity factor. The intensity could represent a single intensity factor for multiple laser beams projected onto the MEMS scanner. The method could also include delaying the adjustment of the drive frequency to allow the resonant frequency change to take affect in the MEMS scanner. Delaying the adjustment could include delaying delivery of the intensity factor such that the intensity factor is provided coincident with the resonant frequency change of the MEMS scanner.

20 Claims, 9 Drawing Sheets

OTHER PUBLICATIONS

Pablo Gomez, "State-of-the-art of MEMS Technology for Design and Fabrication of Micro-Mirrors", Florida International University, Advanced Electronics Systems I, Spring 2003, 12 pages.

Chuanwei Wang, et al., "Implementation of phase-locked loop control for MEMS scanning mirror using DSP", ScienceDirect, Sensor and Actuators A 133, 2007, pp. 243-249.

Randy Sprague, et al., "Bi-axial magnetic drive for Scanned Beam Display mirrors", Proc. of SPIE, vol. 5721, 2005, pp. 1-13.

Shorya Awtar, et al., "Two-Axis Optical MEMS Scanner", Proc. ASPE 2005 Annual Meeting, paper No. 1800, 2005, 4 pages.

James S. Brown, "Method and System for Generating a Drive Signal for a MEMS Scanner", U.S. Appl. No. 12/286,605, filed Oct. 1, 2008.

* cited by examiner

US 8,331,005 B2

METHOD AND SYSTEM FOR PROVIDING RESONANT FREQUENCY CHANGE COMPENSATION IN A DRIVE SIGNAL FOR A MEMS SCANNER

CROSS-REFERENCE TO RELATED APPLICATIONS AND PRIORITY CLAIM

This application claims priority under 35 U.S.C. §119(e) to U.S. Provisional Patent Application No. 61/172,470 filed on Apr. 24, 2009, which is hereby incorporated by reference.

TECHNICAL FIELD

This disclosure is generally related to MEMS technology and, more specifically, to a method and system for addressing a rapid resonant mode frequency change due to heating of the MEMS mirror and/or surrounding structure by LASER beams in a drive signal for a MEMS scanner.

BACKGROUND

Laser-based and LED-based video projectors have been used extensively in business environments and have recently come into wide use in large-screen projection systems in home theaters. The miniaturization of projection systems has led to the development of "pico-projectors" that may be embedded in other systems, such as mobile phones and heads-up displays for vehicle dashboards, or may be implemented as stand-alone devices, such as pocket or ultra-mobile projectors that maybe be powered from a battery or an external power source.

One example of a pico-projector system is the PicoP™ projector engine developed by Microvision, Inc. The PicoP engine includes RGB laser sources, a micro-electro-mechanical system (MEMS) scanning mirror, optics and video processing electronics for receiving video data from a source and generating an image to be projected onto any viewing surface (e.g., a screen, a wall, a sheet of paper or a chair back). However, pico-projection systems such as this that use a MEMS scanning mirror face a number of technical problems that are not as critical in larger projection systems.

A MEMS scanning mirror implemented in a pico-projection system is a two-dimensional scanning mirror, or two separate MEMS mirrors, that sweeps laser beams across a viewing surface similar to the vertical and horizontal sweep of an electron beam in a CRT-based television or monitor. The horizontal sweep is typically done at one of the resonant mode frequencies of the scanning mirror that is on the order of 18 kHz or higher. The vertical sweep is generally desired to be an ideal saw tooth to provide a linear sweep movement from top-to-bottom with minimal retrace time, thus maximizing the allowable active video time.

The two leading methods for generating the horizontal drive signal for a MEMS scanner are phase-locked loop (either digital or analog) and amplitude response peak search. When either of these methods is implemented, rapid and large changes in the brightness of the lasers projected onto the MEMS scanner result in very rapid temperature change of the mirror and/or surrounding structure. This heating causes a shift in the resonant frequency of the MEMS. The frequency change may be small, in the 2 Hz-to-8 Hz range. However, the MEMS resonant mode has a very high Q, which means that a very small change will have a large impact on the MEMS deflection angle. This may result in a large reduction in image size, until the phase-locked loop or peak search loop locks onto the new resonant frequency.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 16, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
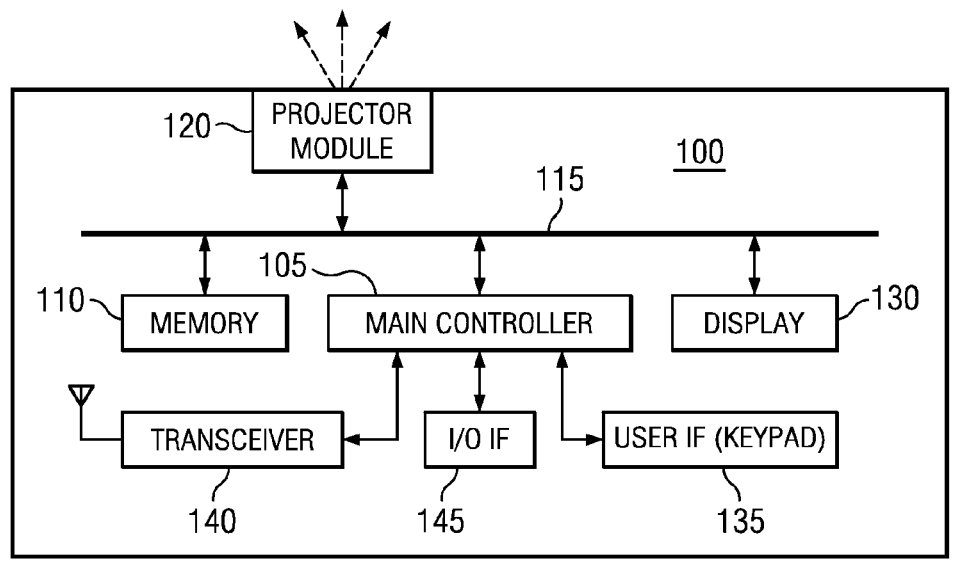
FIG. 1 is a block diagram of a mobile phone that includes a pico-projection system according to one embodiment of the present disclosure.

FIG. 1 is a high-level block diagram of a mobile phone 100, which includes an embedded pico-projection system according to one embodiment of the present disclosure. The mobile phone 100 is simply one particular embodiment of the present invention. Those skilled in the art will readily understand that the miniature projection system described herein may be embedded in other types of portable devices or may be implemented as a stand-alone device.

The illustrated mobile phone 100 comprises a main controller 105, a memory block 110, a communication bus 115, a projector module 120, a display block 130, a user interface (IF) 135, a transceiver 140 and an input-output interface (I/O IF) 145. The main controller 105 is the central processor that supervises the overall operation of the mobile phone 100. The memory block 110 may include one or more conventional read-only memory (ROM) devices and/or random access memory (RAM) devices (including a Flash RAM), as well as an optional removable memory card. The display block 130 may comprise typical LCD color display circuitry that is common to most mobile phones. The communication bus 115 enables the transfer of data between the main controller 105, the memory 110 and the display 130, as well as the projector module 120.

The projector module 120 is a pico-projector device that uses, for example, three laser diodes (red, green and blue) to project an image onto any suitable surface, such as a wall, a screen, a sheet of paper, a desktop, or the like. The main controller 105 controls the projector module 120 in response to user commands that may be received via the user IF 135 or external commands that may be received via the transceiver 140. By way of example, a user may enter commands that cause the main controller 105 to retrieve a slide show presentation file from the memory 110 and to display the slides via the projector module 120 and/or the display block 130.

Figure 2:
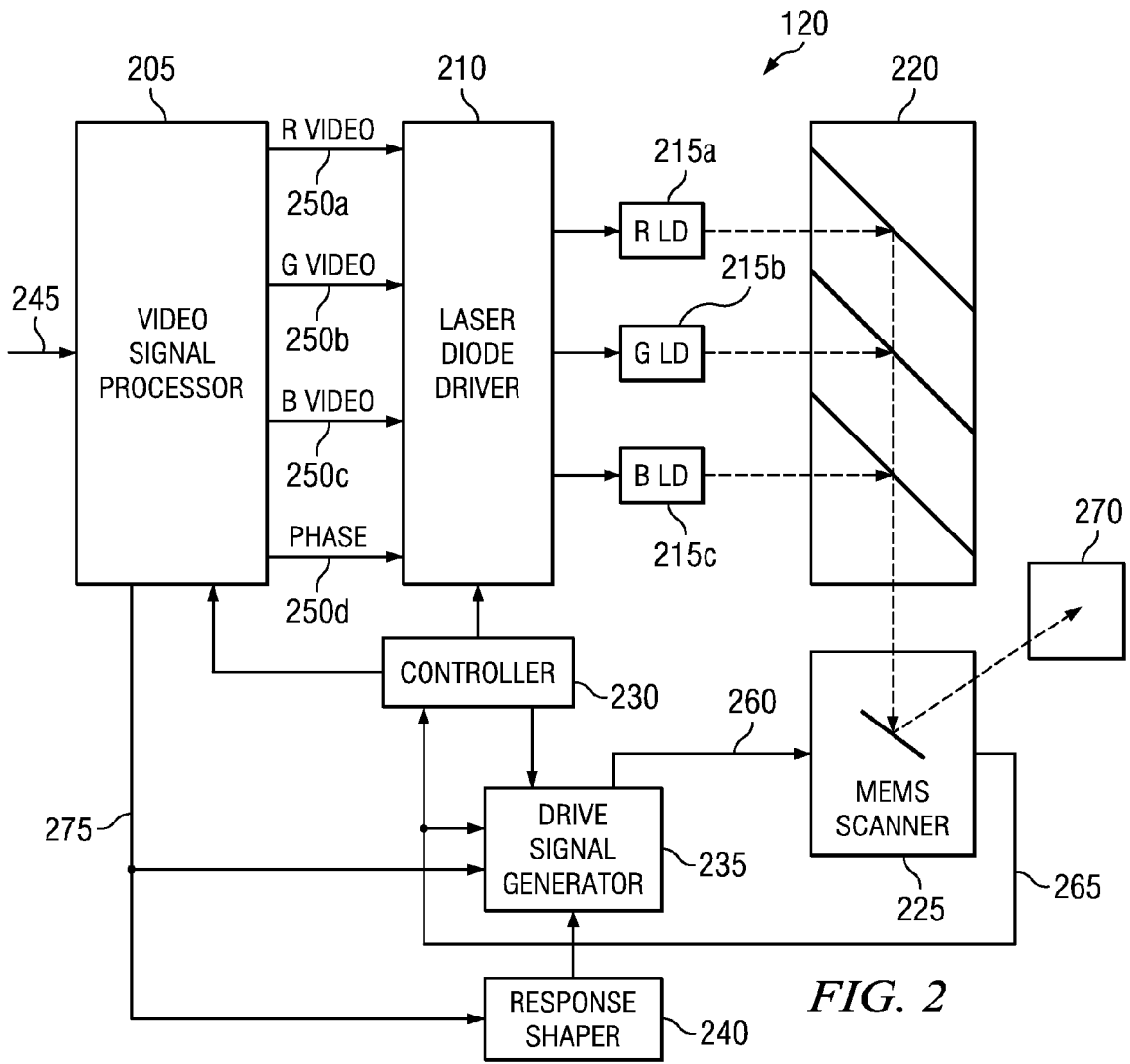
FIG. 2 is a block diagram of selected portions of the projector module of FIG. 1 according to one embodiment of the present disclosure.

FIG. 2 is a block diagram of selected portions of the projector module 120 according to one embodiment of the present disclosure. For the illustrated embodiment, the projector module 120 comprises a video signal processor 205, a laser diode driver 210, a red laser diode (R LD) 215a, a green laser diode (G LD) 215b, a blue laser diode (B LD) 215c, combiner optics 220, an electromagnetic MEMS scanner with integrated sensors 225, a controller 230, a drive signal generator 235 and an optional response shaper 240.

The video signal processor 205 receives an input stream of video data 245, such as RGB 24 video data, and performs a number of conventional video processing operations, such as warping, frame rate conversion, video correction, and the like. The video signal processor 205 outputs final video signals 250. For example, the final video signals 250 may comprise a red video signal 250a, a green video signal 250b and a blue video signal 250c, in addition to a phase signal 250d. The laser diode driver 210 converts the final video signals 250a-d to laser diode bias voltages and bias currents that control the coherent light generated by the laser diodes 215a-c. The colored laser light beams generated by the laser diodes 215a-c are combined into an output light beam by the combiner optics 220.

The controller 230 generates control signals for the drive signal generator 235 and feeds back scanner position information to the video signal processor 205. The control signals may be generated partly based on a sensor signal 265 received by the controller 230 from the scanner sensor of the MEMS scanner 225, which is capable of sensing position and/or movement information related to the MEMS scanner 225. The drive signal generator 235 is capable of generating horizontal and vertical drive signals 260 that cause the MEMS scanner 225 to sweep the light beam that is output by the combiner optics 220 across a viewing surface in order to generate a two-dimensional raster image 270.

As described in more detail below, the video signal processor 205 may generate an intensity factor 275 for the drive signal generator 235. The intensity factor 275 provides a measure of the intensity of the laser beams generated by the laser diodes 215. Adjustments in the intensity of these laser beams projected onto the MEMS scanner 225 may result in a resonant frequency change for the MEMS scanner 225. Due to the high quality of MEMS resonance, and the resulting narrow pass band, a slight shift in resonance frequency causes a visible reduction in mirror deflection. This causes modulation of the size of the image 270 generated by the MEMS scanner 225. Thus, by providing the intensity factor 275, the video signal processor 205 allows the drive signal generator 235 to take this into account and make adjustments to compensate for the resonant frequency change. For alternative embodiments, the intensity factor 275 may be generated by any other suitable component (including a component not shown in FIG. 2) that has information regarding the current brightness of the laser beams.

The mechanical motion of the MEMS scanner 225 may be determined by matching the frequency of the drive signal 260 to a resonant mode frequency of the MEMS scanner 225. For example, the drive signal 260 may comprise a horizontal drive signal capable of causing the MEMS scanner 225 to sweep the light stream back and forth horizontally across the viewing surface at a particular horizontal resonance frequency associated with the MEMS scanner 225. Similarly, the drive signal 260 may comprise a vertical drive signal capable of causing the MEMS scanner 225 to sweep the light stream back and forth vertically across the viewing surface at a particular vertical resonance frequency associated with the MEMS scanner 225. It will be understood that the horizontal drive signal and the vertical drive signal may be provided together as a single drive signal 260 or may be provided by the same or different components as separate drive signals 260.

Based on the sensor signal 265, the controller 230 may determine whether or not to adjust the control signals provided to the drive signal generator 235 in order to change the motion of the MEMS scanner 225 and/or the control signals provided to the laser diode driver 210 in order to change the laser diode bias voltages and bias currents controlling the coherent light generated by the laser diodes 215a-c. In addition, as described in more detail below, the drive signal generator 235 is also capable of receiving the sensor signal 265 and the intensity factor 275 and generating the drive signal 260 based partly on those signals 265 and 275.

The optional response shaper 240 may be implemented to shape the response of the drive signal generator 235 to resemble the thermal response of the HEMS scanner 225, as described in more detail below in connection with FIGS. 6, 14 and 15. Although the illustrated response shaper 240 is shown as separate from the drive signal generator 235, it will be understood that the response shaper 240 may be integrated into the drive signal generator 235 without departing from the scope of this disclosure. For embodiments including a separate response shaper 240, the intensity factor 275 may be provided to the response shaper 240, which is capable of providing the intensity factor 275 to the drive signal generator 235, instead of being provided directly to the drive signal generator 235. For embodiments without the response shaper 240 or with the response shaper 240 included within the drive signal generator 235, the intensity factor 275 may be provided directly to the drive signal generator 235.

Figure 3:
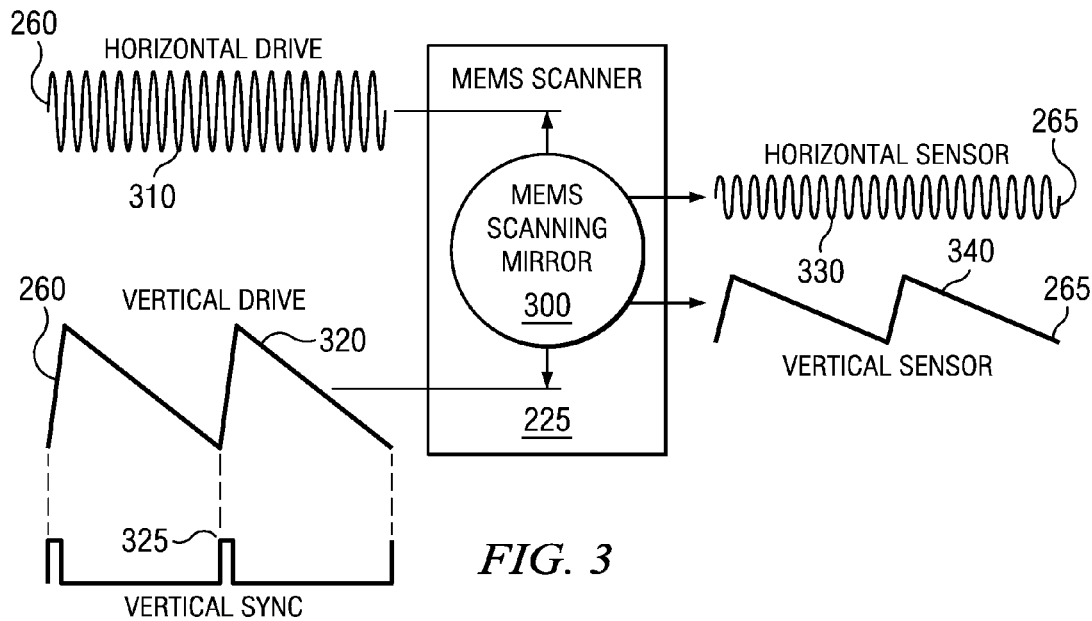
FIG. 3 is a block diagram of a MEMS scanning mirror showing typical drive and sensor waveforms according to one embodiment of the present disclosure.

FIG. 3 is a block diagram of a HEMS scanner 225, including a MEMS scanning mirror 300, showing typical drive and sensor waveforms according to one embodiment of the present disclosure. For the illustrated embodiment, a horizontal drive signal 310 and a vertical drive signal 320 excite the mechanical motion of the MEMS scanner 225. The drive signals 310 and 320 may be applied separately, as shown, or in any other suitable manner. For example, alternative methods may include using a drive signal comprising the composite of the signals 310 and 320 or composite differential of the signals 310 and 320. The signals 310 and 320, in whatever manner chosen, are jointly represented by the drive signal 260 of FIG. 2. Also illustrated in FIG. 3 is a vertical synchronization signal 325, which identifies the beginning of each vertical retrace. The dotted lines show the time relationship between the vertical drive signal 320 and the vertical synchronization signal 325.

In FIG. 3, integral sensors (e.g., transducers) may convert the mechanical motion and/or position of the MEMS scanning mirror 300 into electrical signals for movement and/or position. For the illustrated embodiment, the sensor signals 330 correspond to horizontal axis movement and/or position and the sensor signals 340 correspond to vertical axis movement and/or position. The sensor signals 330 and 340 are jointly represented by the sensor signal 265 of FIG. 2.

Figure 4:
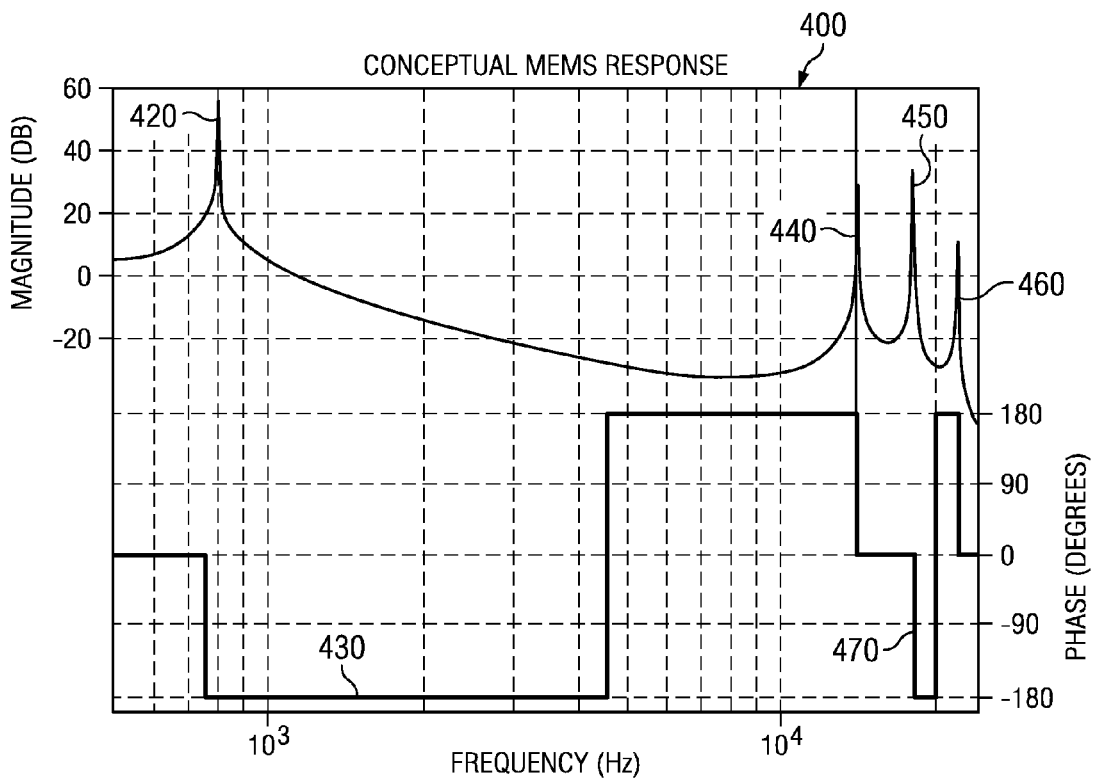
FIG. 4 is a graph illustrating a simplified conceptual MEMS response for various resonant modes according to one embodiment of the present disclosure.

FIG. 4 is a graph 400 illustrating a simplified conceptual MEMS drive-to-sensor response for various resonant modes according to one embodiment of the present disclosure. This gain/phase plot 400 illustrates four resonant modes. An actual physical MEMS scanner 225 may have many more resonant modes. The first mode 420 in this example is at 780 Hz, the second mode 440 is at 14 kHz, the third mode 450 is at 18 kHz, and the fourth mode 460 is at 22 kHz. The third mode 450 in this example is at 18 kHz and has response in the horizontal axis. In this example, the third mode 450 is useful for horizontal sweep, while the first mode 420 is an artifact that interferes with vertical sweep, as described in U.S. patent application Ser. No. 12/283,759, titled "SYSTEM FOR SUPPRESSING UNDESIRABLE OSCILLATIONS IN A MEMS SCANNER," filed Sep. 16, 2008. As will be further described, the second and fourth modes 440 and 460 are undesirable artifacts to be avoided. Magnitude levels are illustrative only since various MEMS designs will have different magnitude responses.

Various means within the controller 230 and the drive signal generator 235 may be employed to match the frequency of the horizontal drive signal 310 to the appropriate MEMS resonant mode 450. A more accurate match results in better horizontal drive-to-angular motion efficiency of the scanner 225. It will be understood that any suitable method for finding and maintaining operation on the MEMS resonant mode frequency may be integrated into signal generator 235 without departing from the scope of this disclosure. This would include any analog or digital phase locked loop, or any peak search hardware/algorithm.

As described in more detail below, the projector module 120 is capable of operating an integrated micro-electromechanical system (MEMS) scanner on a resonant mode frequency using a digital phase-locked loop. In addition, within the digital phase-locked loop, a drive signal 310 may be generated for the MEMS scanner using a direct digital synthesis oscillator.

Thus, for this embodiment, the drive signal generator 235 is capable of finding the correct horizontal resonant mode frequency (to within much less than 1 Hz) and driving the MEMS scanner 225 using this frequency. The drive signal generator 235 is also capable of tracking the appropriate resonant mode frequency over temperature and time, while avoiding driving the MEMS scanner 225 on adjacent resonant modes.

FIG. 4 is a graph 400 illustrating the gain phase of the MEMS scanner 225 according to one embodiment of the present disclosure. For the particular example illustrated in FIG. 4, the resonant mode frequency 450 used for the horizontal sweep has a two-pole, high-Q response.

The gain phase of the MEMS scanner 225 is observable in the graph 400 as the drive-to-sensor transfer function. In addition, the phase waveform 430 at 470, illustrates the −180° phase shift over a very small frequency range that is expected in association with the horizontal resonant mode frequency. This includes a 90° phase lag at the exact horizontal resonant mode frequency. Therefore, the drive signal generator 235 may use this phase relationship as the identifying factor to find and track the correct horizontal resonant mode frequency. It will be understood that a phase lag other than 90° may be used for other suitable applications.

The drive signal generator 235 is capable of finding the horizontal resonant mode frequency by locking the phase relationship between the MEMS horizontal drive signal 310 and the horizontal sensor signal 330 at the desired phase difference (e.g., 90°).

Figure 5:
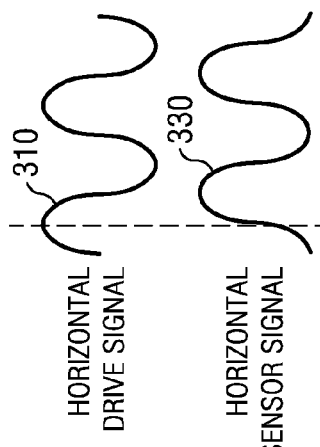
FIG. 5 illustrates horizontal drive and horizontal sensor waveforms.

FIG. 5 illustrates horizontal drive and horizontal sensor waveforms. The horizontal drive signal 310 is representative of the drive waveform associated with resonant mode 450 of FIG. 4. The horizontal sensor signal 330 is representative of the sensor waveform associated with resonant mode 450 of FIG. 4. Sensor signal amplitude is proportional to MEMS deflection angle in the horizontal axis. When operating at the frequency of resonant mode 450, a 90° phase relationship 530 will exist between these two signals 310 and 330.

Figure 6:
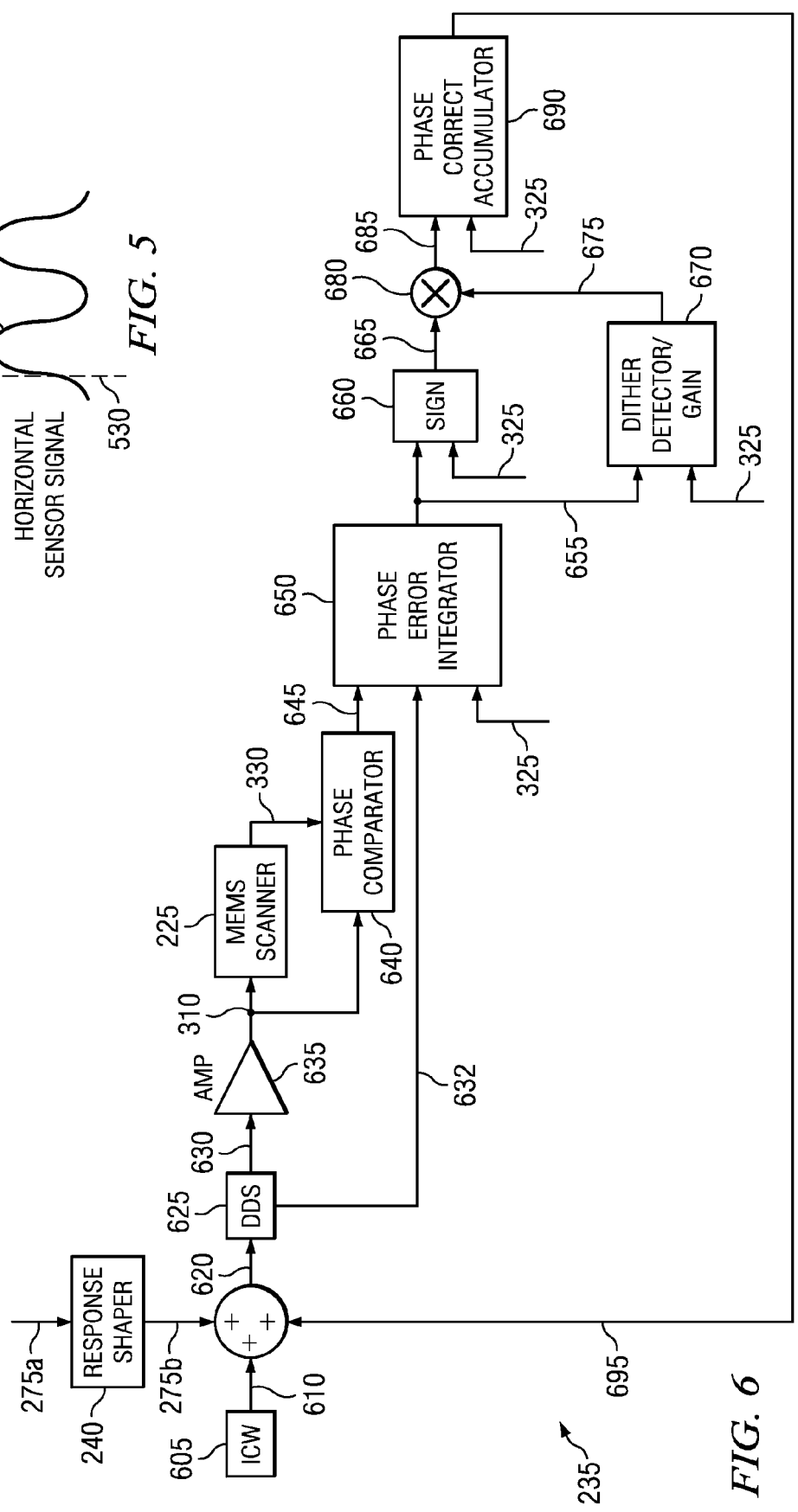
FIG. 6 is a block diagram of the drive signal generator of FIG. 2 according to one embodiment of the present disclosure.

FIG. 6 is a block diagram of the drive signal generator 235 according to one embodiment of the present disclosure. For this embodiment, the drive signal generator 235 comprises an initial control word (ICW) block 605, an adder 615, a direct digital synthesis (DDS), numerically-controlled oscillator 625, an amplifier 635, a phase comparator 640, a phase error integrator 650, a sign block 660, a dither detector/gain block 670, a multiplier 680 and a phase correct accumulator 690. The MEMS scanner 225 is coupled to the drive signal generator 235 at the amplifier 635 and the phase comparator 640. Also, the drive signal generator 235 may comprise or be coupled to an optional response shaper 240.

The optional response shaper 240 is capable of receiving the intensity factor 275 from the video signal processor 205 or other suitable component. The intensity factor 275 comprises a measure of the intensity of the laser beams provided to the MEMS scanner 225. For example, the intensities of each of the beams generated by the red, green and blue laser diodes 215 may be combined to generate the intensity factor 275.

For some embodiments, the intensity factor (IF) 275 may be defined as follows:

$$IF = \frac{k}{N}\sum_{i=1}^{N}(R_i + G_i + B_i),$$

where R is the intensity of the red laser beam, G is the intensity of the green laser beam, B is the intensity of the blue laser beam, k is an intensity scaling constant, and N is the number of intensity samples for each adjustment interval. However, it will be understood that the intensity factor 275 may be otherwise defined without departing from the scope of this disclosure. For example, for one alternative, each laser beam may have its own scaling constant. The intensity factor 275 may be determined based on a predefined adjustment interval. For example, the intensity factor 275 may be based on the intensities of the laser beams being integrated or averaged over each pixel, line, frame or specified number of frames.

When the intensity of the light beam that is output by the combiner optics 220 changes by more than a relatively small amount, the energy incident on the MEMS scanner 225 will change the temperature of the MEMS mirror and/or structure enough to affect the resonant frequency of the MEMS scanner 225. For example, if the intensity suddenly increases due to a change in image content, the light beam may heat the MEMS scanner 225, which causes a shift in the resonant frequency. The drive signal generator 235 cannot instantly adjust to this new resonant frequency. This results in the image width 270 being reduced for a non-insignificant amount of time before the drive signal generator 235 requires the new resonant frequency.

For a particular example, an increase in intensity that results in an 8-Hz frequency shift can require a two-second recovery period. In this example, during the recovery period, the MEMS scanner 225 is not being operated at its resonant frequency. The response magnitude is much smaller and the horizontal size of the image 270 decreases by about half, gradually returning to full size over the two-second recovery period.

The intensity scaling constant, k, may be selected based on the expected response of the MEMS scanner 225 to the intensity of the laser beams. Thus, the intensity scaling constant may be selected in order to result in an intensity factor 275 that allows the drive signal generator 235 to compensate for the expected response of the MEMS scanner 225. This results in a drastic reduction in the recovery period such that the image width 270 is not visibly reduced or is at most minimally reduced.

For some embodiments, the resonant frequency of the MEMS scanner 225 may change at a rate such that the intensity factor 275 may be applied to the adder 615 as soon as it is available. For these embodiments, the response shaper 240 may be omitted. For other embodiments, the resonant frequency of the MEMS scanner 225 may change more slowly such that an immediate application of the intensity factor 275 would result in a frequency adjustment before it was needed. For these embodiments, the response shaper 240 may be included in or coupled to the drive signal generator 235.

The response shaper 240 is capable of receiving the intensity factor 275a and shaping the intensity factor 275a over time before applying the shaped intensity factor 275b to the adder 615. The specified adjustment response is related to the transient thermal response of the MEMS scanner 225 to the intensity of the light beam. This transient thermal response is a function of the thermal mass and thermal resistance of the affected scanner structure. Thus, the adjustment response is selected such that the intensity factor 275 is provided coincident with the resonant frequency change of the MEMS scanner 225. For some embodiments, the response shaper 240 may comprise a digital filter with an adjustable coefficient or other suitable low pass filter.

The initial control word block 605 is capable of storing or generating a predefined initial control word 610, which the adder 615 is capable of adding to an accumulated correction signal 695 from the phase correct accumulator 690 and to the intensity factor 275 in order to generate a summation 620. The initial control word 610 may be set to that required for the nominal horizontal resonant frequency of the MEMS scanner 225. The direct digital synthesis oscillator 625 is capable of receiving the summation 620 and generating a drive signal 630 for the amplifier 635, which is capable of amplifying the drive signal 630 to generate the horizontal drive signal 310 for the MEMS scanner 225. For one embodiment, the amplifier 635 may be capable of receiving the horizontal sensor signal 265 in a closed loop. In addition, the amplification factor for the amplifier 635 may be set to any suitable value that will yield the correct horizontal sweep size.

The horizontal drive signal 310 is also provided to the phase comparator 640, along with the horizontal sensor signal 330 from the MEMS scanner 225. The phase comparator 640 is capable of comparing the drive phase of the horizontal drive signal 310 to the sensor phase of the horizontal sensor signal 330 to generate a comparator output 645 for the phase error integrator 650.

For one embodiment, when the phase lag between the drive phase and the sensor phase is too low (e.g., less than 90°), the frequency of the horizontal drive signal 310 is too low. In this case, the phase comparator 640 may generate a comparator output 645 of +1. For this embodiment, when the phase lag between the drive phase and the sensor phase is too high (e.g., more than 90°), the frequency of the horizontal drive signal 310 is too high. In this case, the phase comparator 640 may generate a comparator output 645 of −1. Thus, the comparator output 645 provides the phase polarity for each horizontal cycle. It will be understood that the outputs 645 may be reversed (+1 for too high and −1 for too low) without departing from the scope of the present disclosure.

In addition to the phase comparator output 645, the phase error integrator 650 is also capable of receiving a vertical synchronization signal 325 and a horizontal rollover signal 632. The horizontal rollover signal 632, as will be further described, is a single-bit logic signal of the same frequency as the signal 630. For one embodiment, other components (not shown in FIG. 6) of the drive signal generator 235 may be implemented to generate a vertical drive signal 320, and one of these components may be capable of generating the vertical synchronization signal 325 based on the vertical drive signal 320. The vertical synchronization signal 325 is a logic signal corresponding to the vertical drive signal retrace (e.g., from low to high).

Figure 9A:
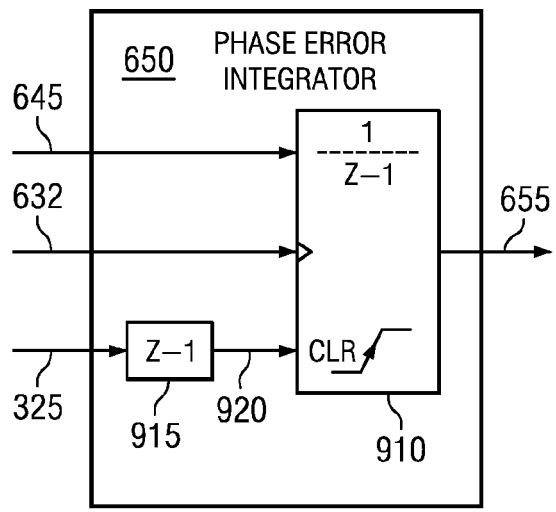
FIG. 9A is a block diagram of the phase error integrator of FIG. 6 according to one embodiment of the present disclosure.

For one embodiment, the phase error integrator 650 is capable of adding the comparator output 645 from the phase comparator 640 to an error signal 655 each time the horizontal rollover signal 632 indicates that a horizontal rollover has occurred. In addition, the phase error integrator 650 is capable of clearing the error signal 655, with a clear signal 920 (as shown in FIG. 9A), which is the vertical synchronization signal 325 delayed by one clock cycle. Therefore, the error signal 655 comprises a sum of the phase errors over one vertical cycle.

Figure 9B:
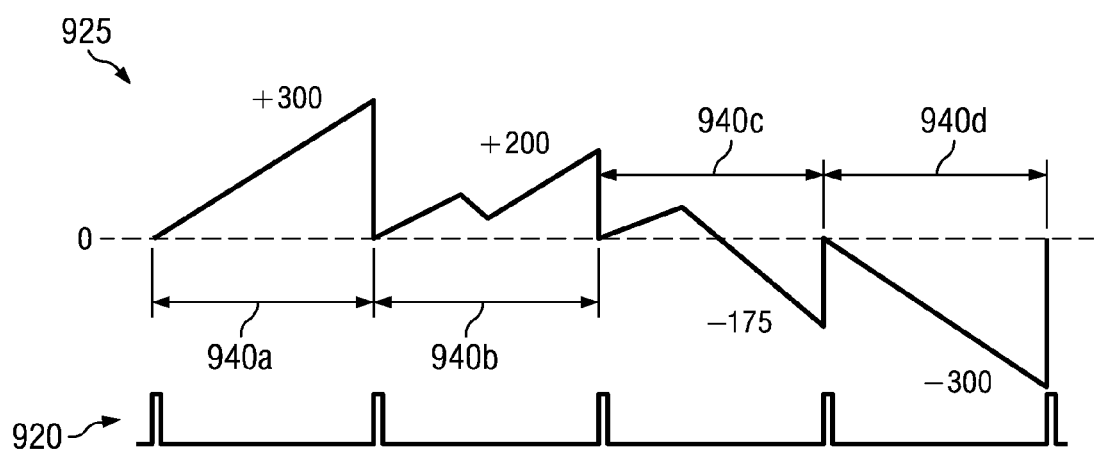
FIG. 9B is a timing diagram for the phase error integrator of FIG. 9A according to one embodiment of the present disclosure.

FIG. 9B represents the error signal 655 and the clear signal 920 of the phase error integrator 650. In the example of FIG. 9B, there are 300 horizontal cycles for each vertical cycle. In a noiseless and static situation, the error signal 655 would be either +N or −N, with nothing in between. However, there is phase noise in signals 645 and 632. Also, since the loop is converging on the correct frequency, it is not static. Thus, the error signal 655 may vary between +N and −N, where N is the number of horizontal cycles for each vertical cycle of the MEMS scanner 225. When the phase is far from the ideal value, the error signal 655 will be either +N or −N. When the phase is closer to the ideal value, the error signal 655 will be somewhere between +N and −N.

The sign block 660 is capable of receiving the error signal 655 and generating a sign 665 of +1 if the value of the error signal 655 is positive and a sign 665 of −1 if the value of the error signal 655 is negative. Only the polarity (±1) is passed from the phase error integrator 650 to the sign block 660. As a result, a strong noise reduction effect is provided because the polarity effectively represents the average phase error over the vertical sweep interval.

The dither detector/gain block 670 is capable of receiving the error signal 655 and the vertical synchronization signal 325 and is capable of generating a gain 675 based on the error signal 655 for each vertical cycle. The dither detector/gain block 670 is capable of detecting when the error signal 655, sampled at the rising edge of the vertical synchronization signal 325, has the opposite polarity as at the previous sample. Thus, detecting that the horizontal drive signal 310 has crossed over the ideal resonant frequency and is moving back in the other direction (i.e., changing from increasing frequency steps to decreasing or vice-versa).

For one embodiment, the gain 675 refers to the size of each step by the phase correct accumulator 690 for a vertical cycle. The dither detector/gain block 670 may be capable of adjusting the gain 675 to allow for larger steps as the drive signal generator 235 begins to search for the correct horizontal resonant mode frequency and successively smaller steps as the correct frequency is approached. The multiplier 680 is capable of applying the sign 665 from the sign block 660 to the gain 675 from the dither detector/gain block 670 to generate a signed gain 685.

The phase correct accumulator 690 is capable of receiving the signed gain 685 and the vertical synchronization signal 325 and generating an accumulated correction signal 695 based on the signed gain 685 for each vertical cycle. To do this, the phase correct accumulator 690 is capable of accumulating corrections provided through the signed gain 685 in order to bring the horizontal drive signal 310 to the correct frequency of the desired MEMS resonant mode. For one embodiment, the phase correct accumulator 690 is not cleared and updates the accumulated correction signal 695 when the vertical synchronization signal 325 indicates that the vertical drive signal 320 is beginning a retrace.

As described above, the accumulated correction signal 695 is provided to the adder 615 to be used, along with the initial control word 610 and the intensity factor 275, in generating the summation 620. In this way, the direct digital synthesis oscillator 625 may be adjusted until the desired phase relationship between the horizontal drive signal 310 and the horizontal sensor signal 330 is achieved (e.g., a 90° phase lag), allowing the MEMS scanner 225 to be operated at the ideal horizontal resonant frequency regardless of resonant frequency changes due to laser intensity. For one embodiment, the drive signal generator 235 may drive the MEMS scanner 225 at an acceptable near resonant frequency as long as the phase relationship between the horizontal drive signal 310 and the horizontal sensor signal 330 is locked to within approximately ±10° of the desired phase lag.

Figure 7A:
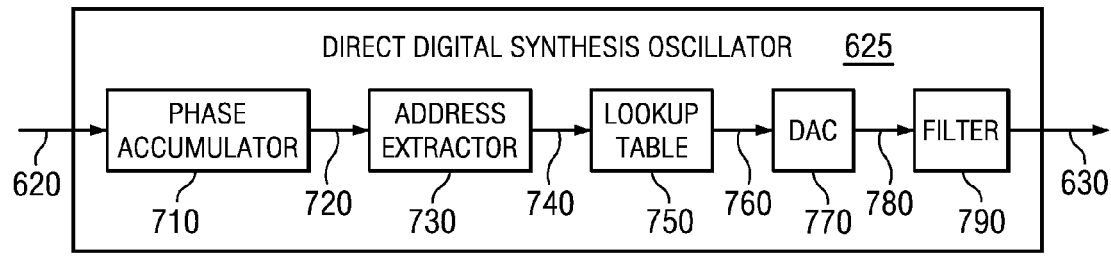
FIG. 7A is a block diagram of the direct digital synthesis oscillator of FIG. 6 according to one embodiment of the present disclosure.

FIG. 7A is a block diagram of the direct digital synthesis oscillator 625 according to one embodiment of the present disclosure. For this simplified embodiment, the direct digital synthesis oscillator 625 comprises a phase accumulator 710, an address extractor 730, a lookup table 750, a digital-to-analog converter (DAC) 770 and a filter 790.

The phase accumulator 710 is capable of receiving the summation 620 of the initial control word 610, the intensity factor 275, and the accumulated correction signal 695 and generating a phase accumulator output 720 based on the summation 620. For one embodiment, the phase accumulator 710 is capable of increasing the phase accumulator output 720 by the value of the summation 620 with each clock cycle. The frequency of operation of the direct digital synthesis oscillator 625 is based on the frequency of rollover for the phase accumulator 710, as shown below:

$$F_O = \frac{CW \times SF}{2^{PA}},$$

where $F_o$ is the frequency of operation, CW is the control word (i.e., the summation 620 in the illustrated embodiment), SF is the sample frequency, and PA is the number of phase accumulator bits. The frequency resolution of the oscillator 625 in Hz is as follows:

$$F_S = \frac{SF}{2^{PA}},$$

For some embodiments, the oscillator 625 may have a frequency resolution less than 10 mHz.

The address extractor 730 is capable of extracting an address 740 for the lookup table 750 based on the phase accumulator output 720. For one embodiment, the address extractor 730 is capable of extracting a specified number of the upper bits of the phase accumulator output 720. For example, for a particular embodiment, the address extractor 730 may extract the upper six bits of the phase accumulator output 720.

The extracted address 740 is used to address the lookup table 750 and generate a lookup table output 760. For one embodiment, the lookup table 750 may be loaded with a sine wave of size 64×6; however, it will be understood that the lookup table 750 may be loaded with other suitable contents without departing from the scope of this disclosure. The digital-to-analog converter 770 is capable of converting the lookup table output 760 from a digital signal to an analog signal 780. The filter 790 is capable of filtering the analog lookup table output 780 to generate the drive signal 630.

Figure 7B:
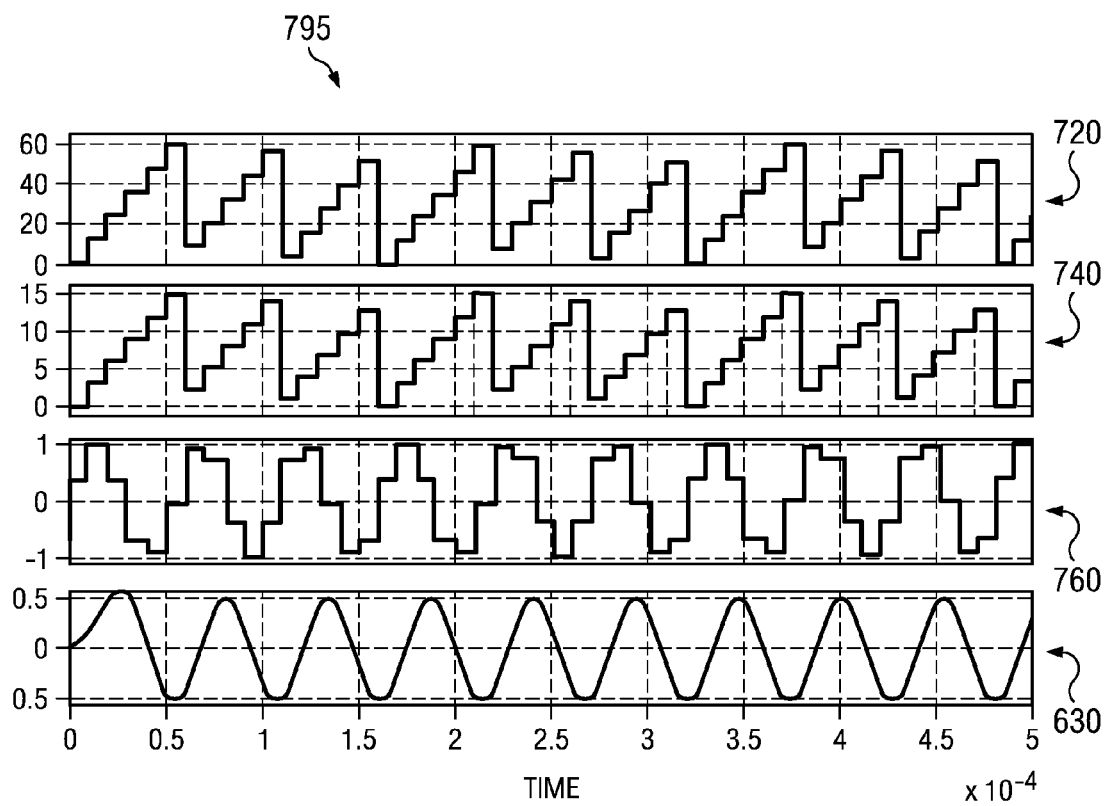
FIG. 7B is a timing diagram for the direct digital synthesis oscillator of FIG. 7A according to one embodiment of the present disclosure.

FIG. 7B is an example of a timing diagram 795 for the direct digital synthesis oscillator 625 according to one particular embodiment of the present disclosure. For this simplified example, which corresponds to the embodiment of the oscillator 625 illustrated in FIG. 7A, the summation 620 (or control word) is 12, the sample frequency is 100 kHz, and the phase accumulator 710 is a 6-bit accumulator. Thus, using the above equation, the operating frequency for this example is 18.750 kHz.

The timing diagram 795 comprises a phase accumulator waveform 720, an address waveform 740, a lookup table output 760, and a drive signal diagram 630. As illustrated in the phase accumulator waveform 720, the phase accumulator output increases by the control word value every clock cycle, while the frequency is set by the frequency of rollover of the phase accumulator 710.

As illustrated in the address waveform 740, the upper four bits of the phase accumulator output 720 are extracted by the address extractor 740 and used to address the lookup table 750. For this simplified example, the lookup table 750 is 16 locations long and has a magnitude resolution of three bits. Thus, the digital-to-analog converter 770 comprises a 3-bit converter.

As illustrated in the lookup table waveform 760, the lookup table 750 exhibits a phase jitter of ±1 clock cycle. This is characteristic of direct digital synthesis. Phase jitter may be greatly reduced with a post-DAC reconstruction filter 790. For example, the filter 790 may comprise a 20 kHz, two-pole filter. The filter 790 generates the drive signal 630 as illustrated in FIG. 7B. While the lookup table output 760 shown in FIG. 7B is barely recognizable as a sine wave, the filtered drive signal 630 shown in FIG. 7B is a credible sine wave with dramatically reduced phase jitter. For other embodiments, higher sample frequencies with larger lookup tables 750 yield very high quality sine wave outputs with insignificant phase jitter or other distortion.

Figure 8:
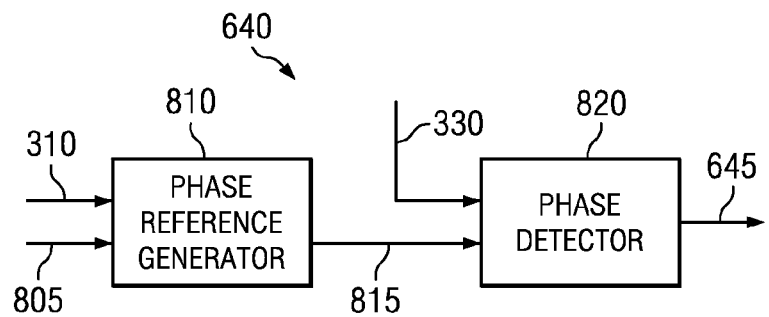
FIG. 8 is a block diagram of the phase comparator of FIG. 6 according to one embodiment of the present disclosure.

FIG. 8 is a block diagram of the phase comparator 640 according to one embodiment of the present disclosure. For this embodiment, the phase comparator 640 comprises a phase reference generator 810 and a phase detector 820. The phase reference generator 810 is capable of receiving the horizontal drive signal 310 and a phase lock signal 805 and generating a phase reference signal 815 based on those signals 310 and 805. The phase detector 820 is capable of receiving the horizontal sensor signal 330 and the phase reference signal 815 and generating the comparator output 645 based on those signals 330 and 815.

For one embodiment, the phase lock signal 805 may provide a predefined number of clock cycles to be used by the phase reference generator 810. The phase reference generator 810 is then capable of delaying the horizontal drive signal 310 from its rising edge by the predefined number of clock cycles. In this way, the phase reference generator 810 may generate a phase reference signal 815 that is delayed with respect to the horizontal drive signal 310 by a specified phase delay (e.g., 90°) that corresponds to the predefined number of clock cycles.

The phase detector 820 is then capable of comparing the phase reference signal 815 to the horizontal sensor signal 330 to determine whether the horizontal sensor signal 330 is delayed with respect to the horizontal drive signal 310 by the specified phase delay. In this way, with each horizontal cycle, the feedback provided via the horizontal sensor signal 330 may be checked to determine whether the signal 330 is leading or lagging the phase reference signal 815, which has the ideal phase desired for the horizontal sensor signal 330.

For a particular embodiment, if the horizontal sensor signal 330 is leading the phase reference signal 815, the frequency is too low and the phase detector 820 generates a +1 for the comparator output 645. Similarly, if the horizontal sensor signal 330 is lagging the phase reference signal 815, the frequency is too high and the phase detector 820 generates a −1 for the comparator output 645.

FIG. 9A is a block diagram of the phase error integrator 650 according to one embodiment of the present disclosure. For this embodiment, the phase error integrator 650 comprises a discrete time integrator 910 and a sample delay 915. The integrator 910 is capable of integrating the comparator output 645 from the phase comparator 640 over one vertical cycle.

For example, for a particular embodiment having three hundred horizontal cycles per vertical cycle, the horizontal rollover signal 632 causes the integrator 650 to sample the comparator output 645 three hundred times to generate an error signal 655 associated with one vertical cycle. Thus, the error signal 655 generated by the phase error integrator 650 has an output range that varies between −300 and +300.

The sample delay 915 is capable of receiving the vertical synchronization signal 325 and delaying it by one sample period. Once the error signal 655 corresponding to each vertical cycle has been provided to the sign block 660, the clear signal 920 clears the integrator 910. The polarity of the error signal 655 indicates whether, on average, the frequency was too high or too low during the vertical cycle period. This averaging effect is helpful in rejecting noise.

FIG. 9B is a timing diagram 925 for the phase error integrator 650 according to one embodiment of the present disclosure. For this example, four vertical cycles 940a-d are illustrated and three hundred horizontal cycles (not shown) are included during each vertical cycle. During the first vertical cycle 940a, the phase delay between the drive phase and the sensor phase was too low (e.g., less than 90°) for all of the horizontal cycles. Thus, the error signal 655 is the maximum of +300 and the frequency of the horizontal drive signal 310 is too low. Similarly, during the second vertical cycle 940b, the phase delay between the drive phase and the sensor phase was too low for most of the horizontal cycles. Thus, the error signal 655 is +200 and the frequency of the horizontal drive signal 310 is still too low.

During the third vertical cycle 940c, the phase delay between the drive phase and the sensor phase was too high (e.g., more than 90°) for most of the horizontal cycles. Thus, the error signal 655 is −175 and the frequency of the horizontal drive signal 310 is too high. Finally, during the fourth vertical cycle 940d, the phase delay between the drive phase and the sensor phase was too high for all of the horizontal cycles. Thus, the error signal 655 is the minimum of −300 and the frequency of the horizontal drive signal 310 is still too high. It will be understood that this example is for illustration only and that, based on the feedback provided through the accumulated correction signal 695, the error signal 655 may generally approach 0 with subsequent vertical cycles 940.

Figure 10:
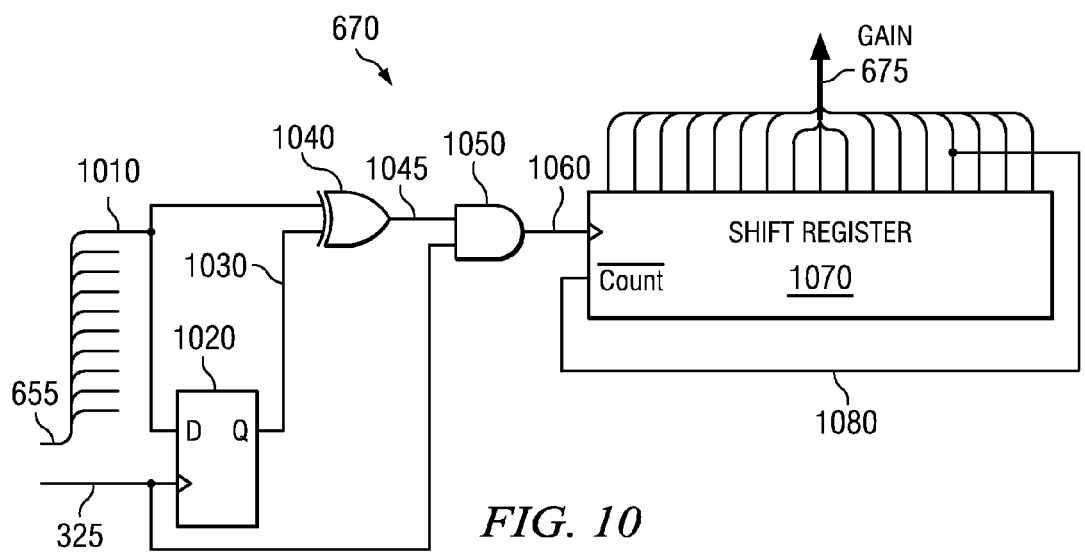
FIG. 10 is a block diagram illustrating the Dither Detect & "Gain" block of FIG. 6 according to one embodiment of the present disclosure.

FIG. 10 is a block diagram illustrating the dither detector/gain block 670 according to one embodiment of the present disclosure. As described above, the drive signal generator 235 uses hysteretic control based on accumulated error correction of a discrete time accumulator (i.e., the phase correct accumulator 690). Because of this, the term "gain" refers to how much the accumulator 690 moves per step (either plus or minus) for every vertical cycle. Thus, the gain function of the dither detector/gain block 670 is optional. If omitted, the "gain" may be set to a size of one count per vertical cycle (i.e., the step for each vertical cycle may be +1 or −1), or to some other appropriate value which is a compromise between lock time and frequency dither.

However, for a particular example, a sample frequency of 20 MHz and a 32-bit phase accumulator 710 may be implemented. For this example, a single step would move the phase correct accumulator 690 by 4.7 mHz. Thus, if the resonant mode of the MEMS scanner 225 was 500 Hz away from the default setting of the drive signal generator 235, it would take over 100,000 vertical cycles (or almost 30 hours) to reach the desired frequency.

On the other hand, since the drive signal generator 235 functions as a hysteretic controller, a single ideal frequency is not identified. Instead, the drive signal generator 235 continues to dither back and forth across the ideal frequency. Thus, once the ideal frequency is identified, it is desirable to reduce the step size in order to minimize the frequency shift with each vertical cycle. Therefore, for one embodiment, the dither detector/gain block 670 may implement a variable step size, starting at a relatively high value and then decreasing and reversing direction each time the loop crosses over the ideal frequency. In this way, an approach similar to successive approximation is implemented.

For the particular embodiment illustrated in the simplified block diagram of FIG. 10, the dither detector/gain block 670 is implemented with a D latch 1020, an exclusive OR gate 1040, an AND gate 1050, and a 15-bit shift register 1070. Inputs to the block 670 are the integrated phase error signal 655 and the vertical synchronization signal 325. The output of the block 670 is the gain signal 675. Dither detection is achieved with the D latch 1020, the exclusive OR gate 1040, and the AND gate 1050. Gain setting is achieved with the shift register 1070.

The D latch 1020 has a data input 1010, which is the sign bit of the error signal 655, and a clock input, which is the vertical synchronization signal 325. Every rising edge of the signal 325, the data input 1010 is shifted into the Q output 1030 of the D latch 1020. At the rising edge of the signal 325, if the latch output 1030 and the data input 1010 are different logic states, the exclusive OR gate 1040 will supply logic one output 1045 to one input of the AND gate 1050. In this case, the signal 325 on the other input to the AND gate 1050 will cause a rising edge at the AND gate output 1060, providing a dither signal 1060 to the clock input of the shift register 1070. This simplified logic explanation is meant to convey the sense of operation without covering specific details about preventing race conditions, timing conflicts, initialization, etc.

The shift register 1070 may be preloaded with a gain 675 that is a high order bit set and will be right-shifted each time a dither signal 1060 occurs, thereby decreasing the gain 675 by a factor of two with each dither.

For a particular embodiment, the gain 675 may be initialized to be $2^{14}$. With each dither detection, as indicated by a rising edge of the dither signal 1060, the contents of the register 1070 may be shifted to divide the gain 675 by two until the value of the gain 675 reaches $2^3$. At this point, a count-not input 1080 changes from a 0 to a 1, inhibiting further dither signals 1060 from changing the value. Thus, for this embodiment, after reaching $2^3$, the gain 675 is no longer shifted in the register 1070 and remains $2^3$ until the shift register 1070 is reinitialized for another frequency search.

For this embodiment (having an initial, maximum gain 675 of $2^{14}$) and continuing with the above example, an initial gain of about 11 Hz per step allows the ideal frequency to be identified typically in less than one second. Once the ideal frequency is identified, using a final, minimum gain 675 of $2^3$ reduces the step size to about 37.3 mHz. The minimum step size could be further reduced, but leaving the step size slightly higher facilitates tracking associated with temperature drift.

Figure 11A:
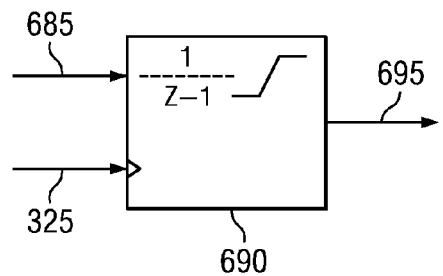
FIG. 11A is a block diagram of the phase correct accumulator of FIG. 6 according to one embodiment of the present disclosure.

FIG. 11A is a block diagram of the phase correct accumulator 690 according to one embodiment of the present disclosure. As described above, the phase correct accumulator 690 is capable of accumulating corrections provided through the signed gain 685 in order to bring the drive signal generator 235 to the correct frequency. For this embodiment, the phase correct accumulator 690 is not cleared but the signed gain 685 is added to the accumulated correction signal 695 at the rising edge of the vertical synchronization signal 325, which indicates the beginning of the vertical retrace. In this way, visual artifacts associated with changing the frequency are avoided.

For one embodiment, the range of the phase correct accumulator 690 may be limited to eliminate the possibility of operating on adjacent MEMS resonant modes. For example, if a malfunction occurs, the accumulated correction signal 695 may be limited so as not to exceed a predefined maximum value or to fall below a predefined minimum value.

Figure 11B:
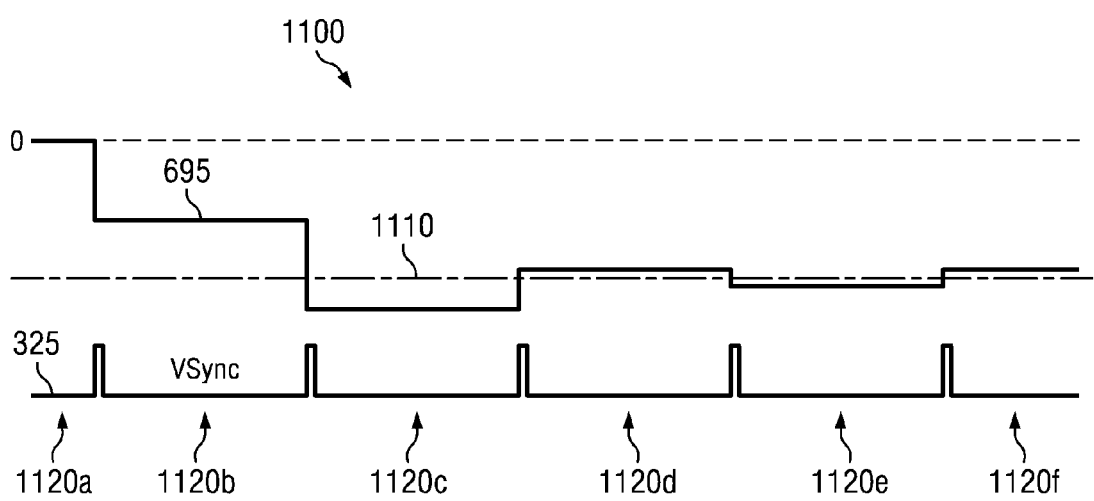
FIG. 11B is a timing diagram for the phase correct accumulator of FIG. 11A according to one embodiment of the present disclosure.

FIG. 11B is a timing diagram 1100 for the phase correct accumulator 690 according to one embodiment of the present disclosure. For this example, six vertical cycles 1120a-f are illustrated for the accumulated correction signal 695, the vertical synchronization signal 325, and the ideal accumulated correction 1110 associated with the horizontal resonant frequency.

The timing diagram 1100 illustrates an example of how decreasing the size of the gain 675 helps the drive signal generator 235 to identify the ideal correction signal 1110 relatively quickly. Because the accumulated correction signal 695 generated by the phase correct accumulator 690 is added to the initial control word 610 and the intensity factor 275, the sign of the gain 675 is important.

In the timing diagram 1100, the ideal correction 1110 for the horizontal resonant frequency is lower than the initial control word 610 added to the intensity factor 275. Thus, after the first vertical cycle 1120a, the correction in the second vertical cycle 1120b is negative. Similarly, the correction in the third vertical cycle 1120c is negative. The correction in the fourth vertical cycle 1120d is positive because the change from the third vertical cycle 1120c overshot the ideal value 1110. The correction in the fifth vertical cycle 1120e is negative because the change from the fourth vertical cycle 1120d overshot the ideal value 1110. The correction in the sixth vertical cycle 1120f is positive because the change from the fifth vertical cycle 1120e overshot the ideal value 1110.

Starting with cycle 1120c of FIG. 11B, the value is approaching closer and closer to its ideal value 1110, because each time there is a correction from overshoot, the gain signal 675 is divided by 2. This pattern continues until the minimum gain value 675 is reached, at which time the correction alternates between positive and negative as the horizontal drive signal 310 generated by the drive signal generator 235 dithers back and forth around the ideal frequency associated with correction value 1110 (FIG. 11B) at the accumulated correction signal 695.

For a particular example, the sample frequency is 20 MHz, the number of phase accumulator bits is 32, the initial control word 610 is 3865471 (for a nominal horizontal resonant frequency of 18 kHz), and the actual horizontal resonant frequency associated with correction 1110 is 17.562 kHz. In addition, as described above, the minimum step size is $2^3$. For this particular example, the ideal correction $C_{Ideal}$ (i.e., signed gain 685) is as follows:

$$C_{Ideal} = \frac{(17,562 - 18,000) \times 2^{32}}{20,000,000} = -94,060.$$

However, the actual correction generated by the multiplier 680 is −94,056 or −94,064. The ideal correction is unavailable because the step size is limited to a minimum of $2^3$. Therefore, in this example, the horizontal drive signal 310 would move back and forth between 17,561.982 Hz and 17,562.020 Hz.

Figure 12:
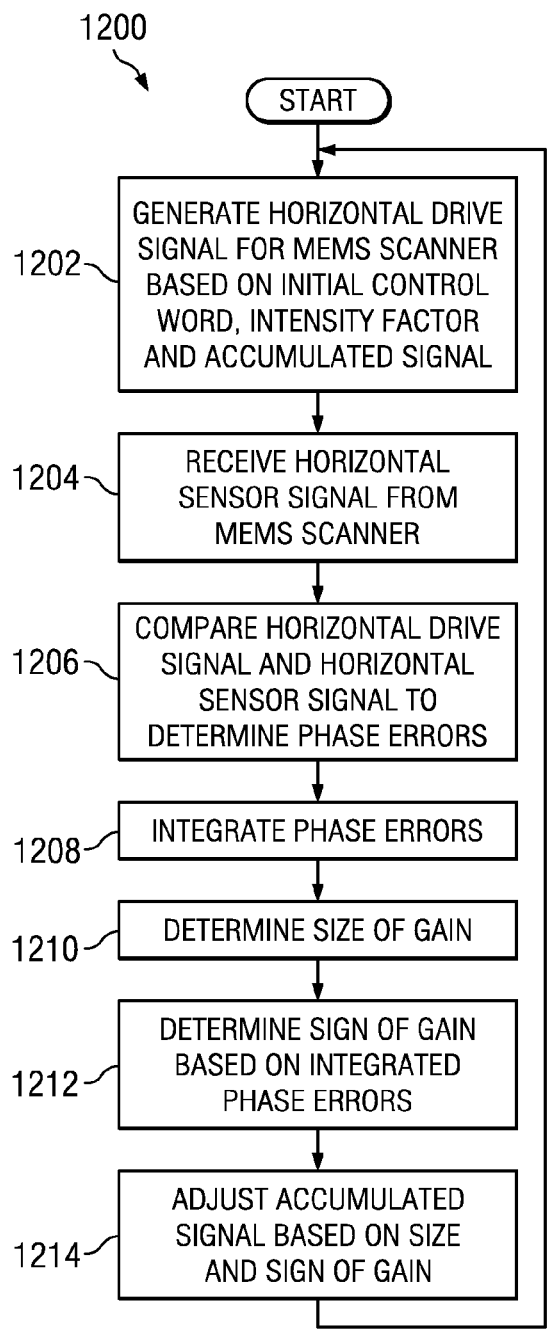
FIG. 12 is a flow diagram illustrating a method for operating the MEMS scanner of FIG. 2 on a resonant mode frequency according to one embodiment of the present disclosure.

FIG. 12 is a flow diagram illustrating a method 1200 for operating the MEMS scanner 225 on a resonant mode frequency according to one embodiment of the present disclosure. Initially, the direct digital synthesis oscillator 625, in conjunction with the amplifier 635, generates the horizontal drive signal 310 for the MEMS scanner 225 based on the initial control word 610, the intensity factor 275, and the accumulated correction signal 695 (step 1202). For one embodiment, the direct digital synthesis oscillator 625 generates the drive signal 630 based on the summation 620 of the initial control word 610, the intensity factor 275, and the accumulated correction signal 695, and the amplifier 635 amplifies the drive signal 630 to generate the horizontal drive signal 310. For a particular embodiment, the direct digital synthesis oscillator 625 may generate the drive signal 630 as described below in connection with FIG. 13.

The phase comparator 640 receives the horizontal sensor signal 330 from the MEMS scanner 225 (step 1204), as well as the horizontal drive signal 310, and compares the signals 310 and 330 to determine phase errors for each horizontal cycle (step 1206). For example, if the phase lag for a horizontal cycle is too low, the phase error may be +1 and, if the phase lag is too high, the phase error may be −1. The phase error integrator 650 integrates the phase errors from each of the horizontal cycles included in one vertical cycle to generate an error signal 655 (step 1208).

The dither detector/gain block 670 determines the size of the gain 675 (step 1210). For example, the dither detector/gain block 670 may begin with a larger gain 675 and decrease the gain 675 with each vertical cycle. For a particular example, the initial gain 675 may be a maximum of $2^{14}$, while each subsequent gain 675 may be determined by right-shifting the gain 675 until a minimum of $2^3$ is reached.

The sign block 660 determines the sign of the gain 675 based on the integrated phase errors (step 1212). For example, the sign block 660 may determine that the gain 675 should be positive when the error signal 655 is positive and that the gain 675 should be negative when the error signal 675 is negative.

The phase correct accumulator 690 adjusts the accumulated correction signal 695 based on the size of the gain 675 and the sign 665 (step 1214). For example, the phase correct accumulator 690 receives the signed gain 685 from the multiplier 680 and adds the signed gain 685 to the previous accumulated correction signal 695 to generate the adjusted accumulated correction signal 695. At this point, the direct digital synthesis oscillator 625, in conjunction with the amplifier 635, generates the horizontal drive signal 310 for the MEMS scanner 225 based on the initial control word 610, the intensity factor 275, and the adjusted accumulated correction signal 695 (step 1202), and the method continues as before.

Figure 13:
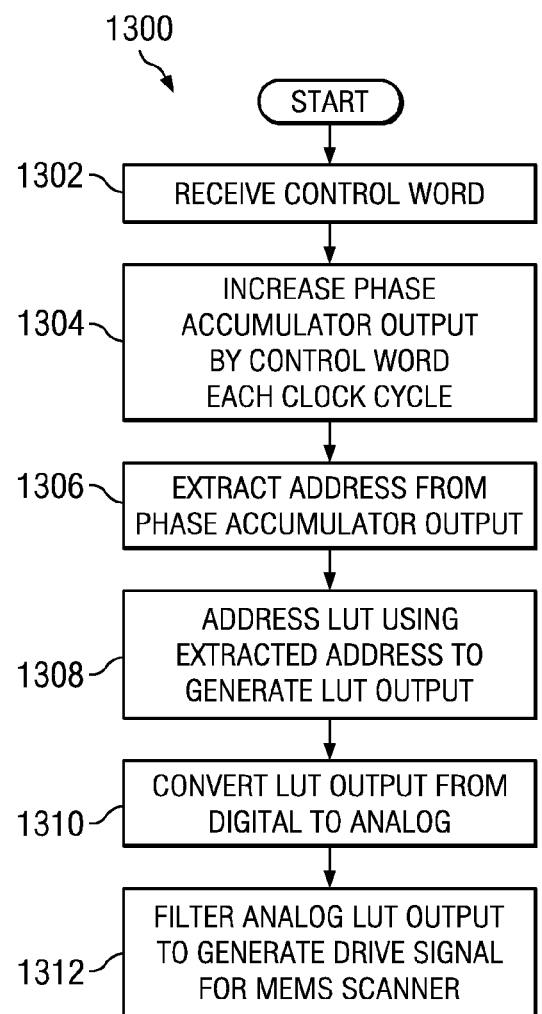
FIG. 13 is a flow diagram illustrating a method for generating a drive signal for the MEMS scanner of FIG. 2 according to one embodiment of the present disclosure.

FIG. 13 is a flow diagram illustrating a method 1300 for generating the drive signal 630, which may be amplified to generate the horizontal drive signal 310 for the MEMS scanner 225, according to one embodiment of the present disclosure. Initially, the phase accumulator 710 receives a control word (step 1302). For example, for one embodiment, the phase accumulator 710 receives the summation 620 of the initial control word 610, the intensity factor 275, and the accumulated correction signal 695 as a control word.

The phase accumulator 710 increases the phase accumulator output 720 by the value of the control word (e.g., the summation 620) with each clock cycle (step 1304). The address extractor 730 extracts an address 740 from the phase accumulator output 720 (step 1306). For example, the address extractor 730 may extract the upper four bits of the phase accumulator output 720 to generate the address 740.

The address extractor 730 addresses the lookup table 750 using the extracted address 740 to generate the lookup table output 760 (step 1308). The digital-to-analog converter 770 converts the digital lookup table output 760 into an analog lookup table output 780 (step 1310). The filter 790 filters the analog lookup table output 780 to generate the drive signal 630 for the MEMS scanner 225 (step 1312). Following this, as subsequent control words are received with each vertical cycle (step 1302), the process is repeated.

Figure 14:
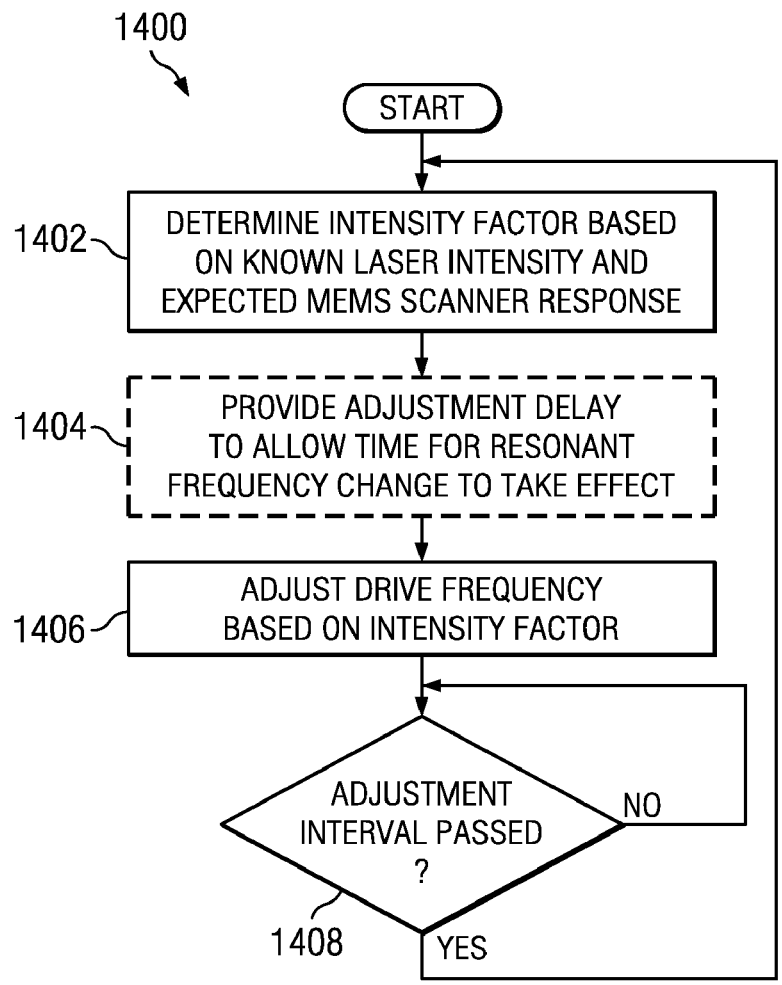
FIG. 14 is a flow diagram illustrating a method for providing resonant frequency change compensation in a drive signal for the MEMS scanner of FIG. 2 according to one embodiment of the present disclosure.

FIG. 14 is a flow diagram illustrating a method 1400 for providing resonant frequency change compensation in a drive signal for the MEMS scanner 225 according to one embodiment of the present disclosure. The embodiment of the method 1400 is for illustration only. Other embodiments of the method 1400 may be implemented without departing from the scope of this disclosure. For example, although the following method 1400 is described with respect to the projector module 120 of FIG. 2 and the drive signal generator 235 of FIG. 6, it will be understood that the method 1400 may be implemented in any suitably arranged projector module and/or drive signal generator without departing from the scope of this disclosure.

Initially, the intensity factor 275 is determined based on the known intensities of the lasers being projected onto the MEMS scanner 225 and the expected MEMS scanner 225 response to those intensities (step 1402). For a particular embodiment, the video signal processor 205 determines the intensity factor 275. Also, for some embodiments, the intensity factor 275 may be determined by combining the intensities of each of the laser beams generated by the laser diodes 215 and applying an intensity scaling constant to the combination. It will be understood that the intensity factor 275 may comprise an average or integrated value of multiple intensity factors over a predefined adjustment interval.

An adjustment delay may be provided to allow time for any resonant frequency change to take effect in the MEMS scanner 225 (optional step 1404). When this optional step is included, the response shaper 240 may be included in or coupled to the drive signal generator 235. For this embodiment, the response shaper 240 is designed to delay the intensity factor 275 by an amount of time equal to the adjustment delay, which is determined based on the transient thermal response of the MEMS scanner 225 to the intensity of the laser beams.

The drive frequency of the MEMS scanner 225 is adjusted based on the intensity factor 275 (step 1406). For some embodiments, the intensity factor 275 is applied directly to the adder 615. For example, the video signal processor 205 may apply the intensity factor 275 to the drive signal generator 235, which may apply the intensity factor 275 to the adder 615 without additional delay. For other embodiments, the intensity factor 275 is applied to the response shaper 240 before being applied to the adder 615. For these embodiments based on the drive signal generator 235 of FIG. 6, applying the intensity factor 275 to the adder 615 results in the drive frequency of the MEMS scanner 225 being adjusted based on the intensity factor 275.

When an adjustment interval has passed (step 1408), a subsequent intensity factor 275 is determined (step 1402), and the method continues as described above. The adjustment interval may comprise any suitable interval. For example, the adjustment interval may correspond to one pixel, one line, one frame, a specified multiple number of frames, or any other suitable interval. Thus, for an adjustment interval corresponding to one frame, for example, the adjustment interval is determined to have passed when each frame is completed.

Figure 15:
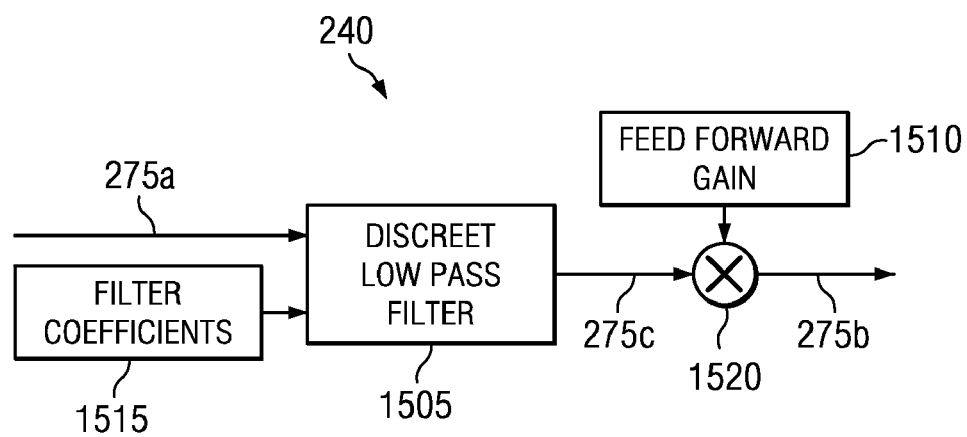
FIG. 15 is a block diagram of the response shaper of FIG. 2 or 6 according to one embodiment of the present disclosure.

FIG. 15 is a block diagram of the response shaper 240 according to one embodiment of the present disclosure. It will be understood that the illustrated response shaper 240 is simply one particular embodiment and that the response shaper 240 may be otherwise suitably implemented without departing from the scope of this disclosure. In addition, it will be understood that the response shaper 240 may be implemented in any suitable projector module and/or any suitable drive signal generator for a MEMS scanner.

The illustrated response shaper 240 comprises a discrete low-pass filter 1505, a feed forward gain 1510, filter coefficients 1515, and a multiplier 1520. For this embodiment, the filter 1505 receives the intensity factor 275a (e.g., from the video signal processor 205 or other suitable component). The filter 1505 also receives the filter coefficients 1515 and filters the intensity factor 275a based on those coefficients 1515 to generate a filtered intensity factor 275c.

The filtered intensity factor 275c is applied to the multiplier 1520, along with the feed forward gain 1510. The multiplier 1520 then multiplies the filtered intensity factor 275c and the feed forward gain 1510 to generate the delayed intensity factor 275b.

Figure 16:
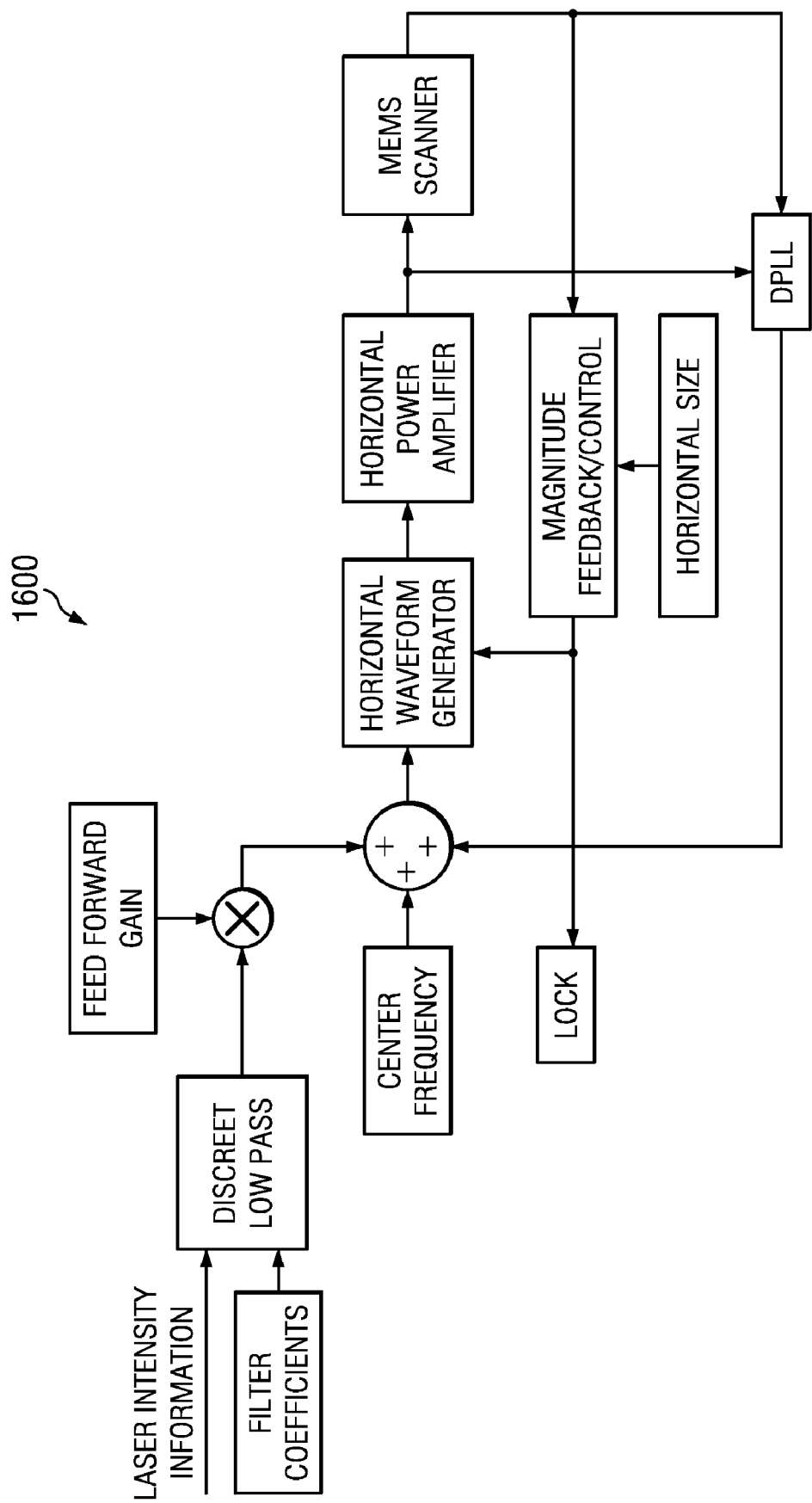
FIG. 16 is a block diagram of a digital phase-locked loop including a response shaper according to one embodiment of the present disclosure.

FIG. 16 is a block diagram of a digital phase-locked loop (DPLL) 1600 including a response shaper according to one embodiment of the present disclosure. It will be understood that the illustrated DPLL 1600 is simply one particular embodiment and that the DPLL 1600 may be otherwise suitably implemented without departing from the scope of this disclosure. In addition, it will be understood that the DPLL 1600 may comprise one particular embodiment of the drive signal generator 235 and the response shaper 240.

It may be advantageous to set forth definitions of certain words and phrases used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean: to include, to be included within, to interconnect with, to contain, to be contained within, to connect to or with, to couple to or with, to be communicable with, to cooperate with, to interleave, to juxtapose, to be proximate to, to be bound to or with, to have, to have a property of, or the like.

While this disclosure has described certain embodiments and generally associated methods, alterations and permutations of these embodiments and methods will be apparent to those skilled in the art. Accordingly, the above description of particular examples does not define or constrain this disclosure. Other changes, substitutions, and alterations are also possible without departing from the spirit and scope of this disclosure, as defined by the following claims.

What is claimed is:

1. A method for controlling a MEMS (micro-electromechanical system) scanner that includes a MEMS scanning mirror, comprising:
    driving the MEMS scanner with a drive signal for scanning one or more laser beams projected onto the MEMS scanning mirror at a frequency related to a resonant mode frequency of the MEMS scanner;
    determining an intensity factor corresponding to an intensity of the one or more laser beams; and
    adjusting the drive signal in response to changes in the determined intensity factor to compensate for changes in the resonant mode frequency due to changes in the intensity factor.

2. The method of claim 1, wherein the intensity factor is determined based on an expected response of the MEMS scanner to the intensity of the one or more laser beams.

3. The method of claim 1, wherein a single intensity factor is determined for multiple laser beams by combining an intensity of each of the laser beams and applying an intensity scaling constant based on an expected response of the MEMS scanner to the combined intensities.

4. The method of claim 1, further comprising:
    Introducing an adjustment delay in the adjustment of the drive signal, the adjustment delay corresponding substantially to a completion of the changes in the resonant mode frequency.

5. The method of claim 4, wherein the adjustment delay corresponds to a transient thermal response of the MEMS scanner to the one or more laser beams.

6. The method of claim 4, wherein the intensity factor is determined substantially coincident with the completion of the resonant mode frequency change.

7. The method of claim 1, wherein the intensities of the one or more laser beams corresponds to an input stream of video data.

8. An apparatus for controlling a MEMS (micro-electromechanical system) scanner that includes a MEMS scanning mirror, comprising:
    a drive signal generator configured to provide a drive signal to the MEMS scanner for scanning one or more laser beams projected onto the MEMS scanning mirror at a frequency related to a resonant mode frequency of the MEMS scanner;
    a control unit coupled to the drive signal generator and configured to determine an intensity factor corresponding to an intensity of the one or more laser beams;
    the drive signal generator configured to adjust the drive signal in response to changes in the determined intensity factor to compensate for changes in the resonant mode frequency due to changes in the intensity factor.

9. The apparatus of claim 8, wherein the intensity factor is determined based on an expected response of the MEMS scanner to the intensity of the one or more laser beams.

10. The apparatus of claim 8, wherein a single intensity factor is determined for multiple laser beams by combining an intensity of each of the laser beams and applying an intensity scaling constant based on an expected response of the MEMS scanner to the combined intensities.

11. The apparatus of claim 10, wherein the control unit is configured to determine the intensity factor by combining an intensity of each of the laser beams and applying an intensity scaling constant based on an expected response of the MEMS scanner to the combined intensities.

12. The apparatus of claim 8, further comprising:
    a response shaper coupled to the drive signal generator and configured to Introduce an adjustment delay in the adjustment of the drive signal, the adjustment delay corresponding substantially to a completion of the resonant mode frequency change.

13. The apparatus of claim 12, wherein the adjustment delay corresponds to a transient thermal response of the MEMS scanner to the one or more laser beams.

14. The apparatus of claim 12, wherein the response shaper is configured to delay the provision of the intensity factor to the drive signal generator substantially coincident with the completion of the resonant mode frequency change.

15. The apparatus of claim 12, wherein the intensities of the one or more laser beams corresponds to an input stream of video data.

16. A system comprising:
    a MEMS (micro-electro-mechanical system scanner including a MEMS scanning mirror; and an apparatus comprising a drive signal generator and a control unit coupled to the drive signal generator;

the drive signal generator being configured to provide a drive signal to the MEMS scanner for scanning one or more laser beams projected onto the MEMS scanning mirror at a frequency related to a resonant mode frequency of the MEMS scanner;

the control unit being configured to determine an intensity factor corresponding to an intensity of the one or more laser beams;

the drive signal generator being configured to adjust the drive signal in response to changes in the determined intensity factor to compensate for changes in the resonant mode frequency due to changes in the intensity factor.

17. The system of claim 16, wherein the intensity factor is determined based on an expected response of the MEMS scanner to the intensity of the one or more laser beams.

18. The system of claim 16, wherein:

a single intensity factor is determined for multiple laser beams by combining an intensity of each of the laser beams and applying an intensity scaling constant based on an expected response of the MEMS scanner to the combined intensities; and the control unit is configured to determine the intensity factor by combining an intensity of each of the laser beams and applying an intensity scaling constant based on an expected response of the MEMS scanner to the combined intensities.

19. The system of claim 16, wherein the apparatus further comprises:

a response shaper coupled to the drive signal generator and configured to Introduce an adjustment delay in the adjustment of the drive frequency, the adjustment delay corresponding to a completion of the resonant mode frequency change.

20. The system of claim 19, wherein the adjustment delay corresponds to a transient thermal response of the MEMS scanner to the one or more laser beams, and the determined intensity factor is provided to the drive signal generator substantially coincident with the completion of the resonant mode frequency change.

\* \* \* \* \*